UNITED STATES PATENT OFFICE

IAN C. SOMERVILLE, OF FOX CHASE, PENNSYLVANIA, ASSIGNOR TO ROHM & HAAS COMPANY, A CORPORATION OF DELAWARE

LONG CHAIN AMINE SALTS

No Drawing.   Application filed June 25, 1930.  Serial No. 463,839.

This invention relates to new products suitable for use as wetting, cleansing and emulsifying agents.

In my co-pending application Serial No. 367,632 filed May 31st, 1929, of which this application is a continuation in part, I disclose the preparation of new compounds possessing qualities which make them very desirable for use in wetting, cleansing and emulsifying.

In general such materials are effective largely on account of their effect on the interfacial tension between water and an oily or greasy surface. The magnitude of this effect appears to depend on (a) the presence of certain groups in the molecule and (b) on the shape and general configuration of the molecule. By taking these factors into consideration I have discovered a series of substances which possess the above-named properties in a remarkable degree.

It is well known that ammonia and organic substituted ammonias such as the methylamine have cleansing properties. These almost entirely disappear however when these substances are converted into their salts, with, for example, the mineral acids. Thus a solution of ammonium chloride has practically no cleansing properties, and the same holds for methylamine hydrochloride. Further up the homologous series n-amylamine is found to have considerable wetting properties while the corresponding hydrochloride is a very feeble wetting agent. In general the salts of such amines are far inferior in cleansing properties to the amines themselves.

I have now discovered a new series of compounds, the salts of tertiary alkyl amines, which, provided the alkyl groups are suitably selected, possess to a large degree the property of reducing the surface tension of aqueous solutions. To secure this effect I prepare a tertiary alkyl amine in which one alkyl radical consists of a long straight carbon chain fully saturated with hydrogen, while the other two alkyl radicals have no more than two carbon atoms each, linked in the same way as the long chain. The degree of wetting which may be secured at low concentrations of these materials depends, other things being equal, on the length of the long chain. By extending the length of the chain, I have now discovered a further extension of this series, to include salts of amines of the general formula

where R stands for a fully saturated straight chain alkyl group of from 17 to 26 carbon atoms, $R_1$ and $R_2$ represent alkyl or substituted alkyl groups, such as hydroxy alkyl groups.

These materials show a falling off in wetting properties but tend to form more stable emulsions. They may be prepared by heating the halogen derivative corresponding to the long chain alkyl radical with the di-n-alkyl amine selected; or the primary amine corresponding to the long chain alkyl radical may be alkylated by any of the standard methods. The salts are formed by neutralization with the acid chosen. The common mineral acids are most convenient but the soluble organic acids such as acetic, oxalic, citric may also be utilized.

These salts are solids, generally of soaplike appearance. In some cases they may be prepared in crystalline form by recrystallization from organic solvents. They give aqueous solutions which foam readily and have wetting qualities at large dilutions. The higher members described in this application cannot be secured in strong aqueous solution on account of insolubility, but do possess properties of the same order in the low concentrations obtainable. These solutions possess powerful emulsifying qualities for oils, and are valuable for instance in fatliquoring of leather. They have the property of forming insoluble lakes with many acid or direct dyestuffs; this may be utilized in the mordanting of vegetable-tanned leather. Alternatively these materials may be used in assisting the penetration of basic dyes on vegetable-tanned leather.

The following examples illustrate the method of preparation, but other standard methods may be used if desired. The invention is not however confined to these examples.

Example 1.—N-di-ethyloctadecylamine sulphate 60 grams octadecyl bromide, 66 grams diethylamine are warmed up under reflux condenser for 14 hours, when considerable separation of diethylamine hydrobromide takes place. After cooling these crystals are filtered off and washed with ether. This ether extract is added to the filtrate, then this washed with water to remove excess of diethylamine. This is then extracted with dilute acid water, made strongly basic with caustic soda, and the amine which separates on the surface taken up in ether. The ether extract is dried, the ether removed, and the residue vacuum distilled. The fraction boiling between 178 and 180° C/1 mm. is collected. This is neutralized with sulphuric acid, when a soap-like solid is obtained.

Example 2.—N-di-ethanoloctadecylamine hydrochloride 67 grams octadecyl bromide, 110 grams diethanolamine, 200 ml. diethylcarbinol are mixed together and refluxed for 6 hours. The product is poured into a large volume of water, and extracted with ether. The ether layer is washed thoroughly with water. It is then taken up in a large volume of weakly acid solution, when any unchanged octadecyl bromide remains behind in the ether. The acid aqueous layer is made basic with caustic soda and extracted with ether. The ether extract is dried, and ether distilled off. The free amine is taken up in acetone and neutralized with hydrochloric acid. The salt separates on standing, in crystalline form. It may be recrystallized from acetone if desired.

Example 3.—N-di-methyloctadecylamine salts 67 grams octadecyl bromide, 150 m. l. dimethylamine (33% aqueous solution), 200 m. l. primary active amyl alcohol, 200 m. l. ethyl alcohol 95% are mixed in a round bottomed flask and warmed up under reflux condenser. After refluxing gently for 18 hours the reaction is stopped, when a test drop in dilute acid solution is almost completely soluble. Excess of dimethylamine and ethyl alcohol are removed by distillation at low temperatures, then the residue poured into a large volume of water and made just acid with dilute hydrochloric acid. If the solution obtained at this stage is clear, no ether extraction is carried out. If not, any unchanged octadecyl bromide is removed by ether extraction. The aqueous solution is now made basic and the free base taken up in ether. The ether layer is washed several times with water, then the amine removed by extraction with a large volume of acidified water. The acid solution is removed, made basic and again extracted with ether. The free amine obtained by distilling off the ether is neutralized with citric, oxalic, acetic, or a mineral acid to give the salt desired.

Example 4.—N-di-ethylcerylamine oxalate

Primary active amyl alcohol referred to in the above example is sometimes called commercially active iso amyl alcohol and is also known as secondary butyl carbinol. It has the following formula:

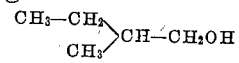

The particular product used in the above example has the following specifications: 95% distills between 125° C. and 131° C. and the normal impurities present are small quantities of methyl propyl carbinol and iso butyl carbinol. The true boiling point is usually given as 128° C.; specific gravity 0.8169.

30 grams ceryl bromide, 24.6 gram diethylamine are warmed up under reflux condenser and boiled gently for 16 hours. On cooling the mixture solidifies. It is dissolved in ether, and the excess of diethylamine removed by washing with water. Acidified water is now used in large amount to extract the desired amine from the ether layer; in this process some of the salt separates in solid form. This is removed, and mixed with the aqueous extracts, the whole made basic with caustic soda. The free base is taken up in ether, the ether solution dried, and excess of ether removed by distillation. The remainder is vacuum distilled and the portion boiling at 265–268° C./2–3.5 mm. collected. This is taken up in large volume of acetone and neutralized with the calculated amount of oxalic acid. The salt separates on concentration of the solution.

Be it understood that the above examples are merely illustrative of the preparation of a representative number of the new compounds and are not to be construed as limiting this invention as to method, materials, nor details of procedure.

I claim:

1. As new products the salts of amines of the general type

where R represents a long straight chain hydrocarbon of from 17 to 26 carbon atoms, $R_1$ and $R_2$ represents radicals of not more than 2 carbon atoms of the class consisting of alkyl and hyroxy alkyl groups.

2. As new products the salts of amines of the general type

where R represents a long straight chain hydrocarbon of from 17 to 26 carbon atoms, $R_1$ and $R_2$ represent alkyl radicals containing not more than 2 carbon atoms.

3. As new products the salts of amines of the general type $$R-N\begin{matrix}R_1\\R_2\end{matrix}$$

where R represents the octadecyl radical, $R_1$ and $R_2$ represent alkyl groups of not more than 2 carbon atoms.

4. As new products the salts of amines of the general type $$R-N\begin{matrix}R_1\\R_2\end{matrix}$$

where R represents the octadecyl radical, $R_1$ and $R_2$ represent ethyl groups.

5. As new products the salts of N-di-ethyloctadecylamine.

6. As a new product N-di-ethyloctadecylamine sulphate.

7. As a new product N-di-ethanoloctadecylamine hydrochloride.

In testimony whereof I affix my signature.

IAN C. SOMERVILLE.